Oct. 15, 1974  R. L. DELORME  3,841,958
REINFORCED STRUCTURAL ELEMENT AND METHOD OF MAKING THE SAME
Filed Aug. 14, 1972  3 Sheets-Sheet 1
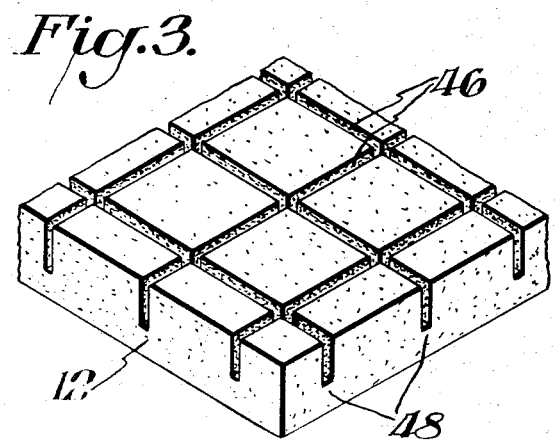
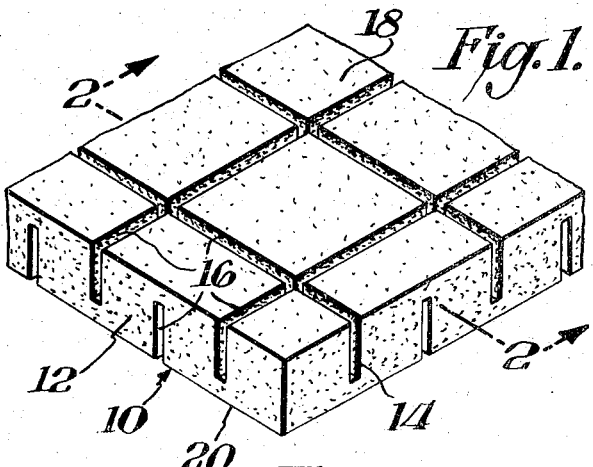
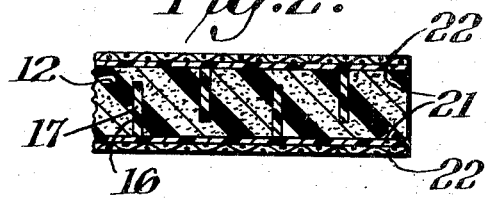
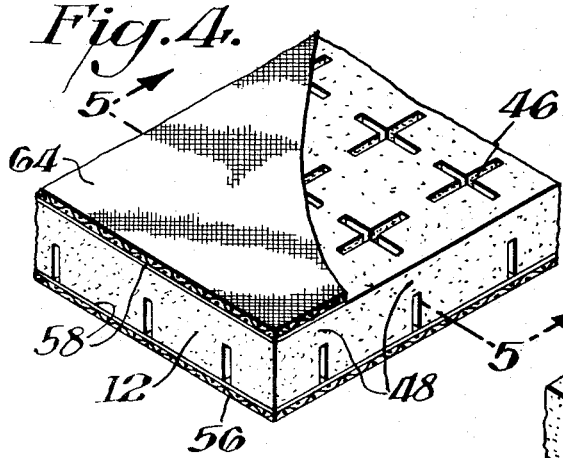
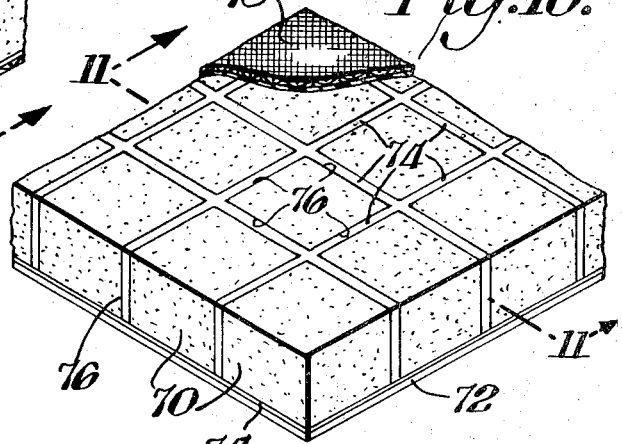
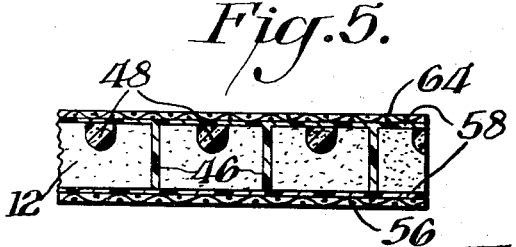
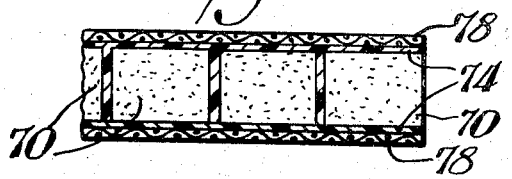
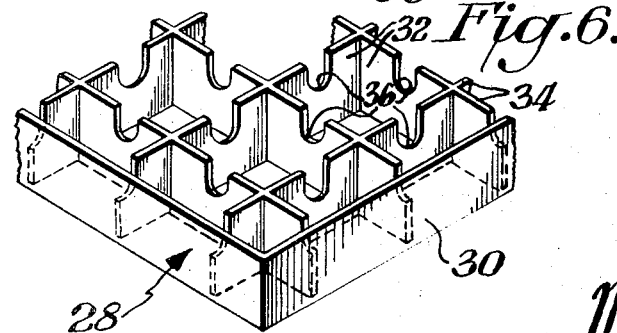
INVENTOR
Richard L. Delorme
BY
Mortenson and Weigel
ATTORNEYS Oct. 15, 1974    R. L. DELORME    3,841,958
REINFORCED STRUCTURAL ELEMENT AND METHOD OF MAKING THE SAME
Filed Aug. 14, 1972    3 Sheets-Sheet 2

INVENTOR
Richard L. Delorme
BY
Mortenson and Weigel
ATTORNEYS

United States Patent Office
3,841,958
Patented Oct. 15, 1974

3,841,958
REINFORCED STRUCTURAL ELEMENT AND
METHOD OF MAKING THE SAME
Richard L. Delorme, 916 Pickett Lane,
Newark, Del. 19711
Continuation-in-part of abandoned application Ser. No.
177,895, Sept. 2, 1971. This application Aug. 14, 1972,
Ser. No. 280,532
Int. Cl. B32b 3/26, 3/30
U.S. Cl. 161—161
7 Claims

ABSTRACT OF THE DISCLOSURE

A sandwich-type structural member is fabricated by first forming an integral, continuous matrix of cavities in a sheet of lightweight cellular material. The cavities are first filled with a fluid plastic material and then the fluid material is converted into a rigid lattice-like array of support members bonded to the cellular material, thereby to provide structural strength. Face sheets, preferably of a glass cloth web, are bonded, using the same fluid plastic material, to the exposed faces of the member to further enhance its structural strength while adding little additional weight.

In another method of the invention, the rigid lattice-like array of support members bonded to the cellular material filler is formed by bonding a plurality of sheets of cellular material together face to face with a hardenable plastic material. The bonded sheets are then cut transversely to form slabs and the slabs bonded together face to face with the hardenable plastic material. The resulting structure is then cut transversely to the lattice-like array to form the structural member.

BACKGROUND OF THE INVENTION

This application is a continuation-in-part of an application Ser. No. 177,895, filed Sept. 2, 1971, now abandoned, by Richard L. Delorme entitled "Reinforced Structural Element and Method of Making the Same."

Numerous structural members such as panels and the like have been constructed using a great variety of material in order to achieve high bending, compressive and/or shear strength and yet maintain a low density. These panels have found usage in many structural applications not only in buildings but also in truck and trailer bodies, railroad cars, boats, and even aircraft to name but a few. The panels are either planar or curvilinear depending upon the application. In many of these applications it is essential not only that the panel have the high strength as noted, but also that it be securely bonded such that the component parts comprising the panel do not loosen or become disengaged. Many of the sandwich-type panels comprise a layered-type construction in which the bonding is quite easily broken under stress.

Among these so-called sandwich-type panels are those which have sought in effect to layer the foam or other cellular materials between face plates having a relatively high strength. Here again the surface bonding is not always adequate and is too easily broken. Also, the inherent layer-type design does not accommodate panels having a high degree of rigidity without unduly increasing the weight. The foam itself has little compressive strength. With these and other deficiencies the sandwich-type panels tend to lack sufficient bending, compressive and/or shear strength to permit their usage in any but a relatively few applications.

Accordingly, it is an object of this invention to provide an improved structural member having a high strength to weight ratio.

Another object of this invention is to provide an improved structural member of a sandwich-type which is securely and integrally bonded together to form an element having high compressive strength.

Still another object of this invention is to provide an improved method of constructing sandwich-type panels which are intimately bonded and have good bending, shear and compressive strength.

A further object of the invention is to provide an improved method of constructing sandwich-type panels having a skeletal structural framework intimately bonded therein.

BRIEF DESCRIPTION OF THE INVENTION

A sandwich-type structural member constructed in accordance with this invention comprises a relatively rigid, preferably plastic, lattice-like frame having faces. The voids in the frame contain a lightweight filler material securely bonded to the frame. Finally, face sheets of a suitable material are bonded to the respective faces of the resulting composite to form members having relatively high structural strength.

In a preferred embodiment of this invention the frame is formed of a thermosetting resin and the cellular material of a polyurethane foam which is capable of adhering securely to the frame of the thermosetting resin. The face sheets may be glass cloth thoroughly impregnated with the thermosetting resin such that when the resin is cured, the face sheets together with the frame elements form in effect a plurality of criss-crossing I-beams to provide an extremely strong but yet lightweight member having good bending, shear and/or compressive strengths.

In accordance with the method of this invention the structural members are formed by selecting first a sheet of lightweight material and forming a matrix or lattice-like array of grooves throughout the thickness dimension of the material. These grooves are then filled with a fluid plastic material which is subsequently cured or hardened to form a composite having a rigid lattice-like frame securely and intimately bonded to the lightweight material. As a final step, face sheets are bonded to either face of the structure, utilizing the same fluid plastic material as is employed to fill the groove cavities such that, when hardened to a rigid form, the face sheets are bonded to both the rigid frame and the lightweight material to form an interlocking, securely bonded structural member.

In accordance with the preferred method of the invention, the cavities are constructed by forming rows and columns of grooves in each of the respective faces of a sheet of cellular material. The grooves are such that portions of each groove extend through the thickness dimension of the material thereby to provide an interconnecting link or matrix of cavities between the face sheets that are subsequently placed on either face of the material. The resulting structure thus has an integral lattice-like frame which when hardened provides a unique structural strength. The grooves are cut using either mechanical cutting techniques, hot wire cutting techniques using molds, or other suitable techniques as may be desired.

According to a still more preferred method of this invention a structural member is fabricated by bonding a plurality of sheets of cellular material together face to face with a hardenable plastic material, whereby the plastic material forms rigid sheet-like layers, cutting the bonded sheets transversely to said sheet-like layers to form slabs, each having a pair of opposite faces, and bonding the slabs together face to face with the hardenable plastic material. The plastic material forms second rigid sheet-like layers intersecting and integral with the first sheet-like layers thereby to define a rigid lattice-like framework bonded to the cellular material for structural strength. This structure may then be cut transversely to the lattice-like framework to form sheets of the structural member.

BRIEF DESCRIPTION OF THE DRAWINGS

The novel features that are considered characteristic of this invention are set forth with particularity in the appended claims. The invention, itself, however, both as to its organization and methods, as well as additional objects and advantages thereof, will best be understood from the following description when read in connection with the accompanying drawings, in which:

FIG. 1 is a pictorial view of the core of a structural member constructed in accordance with one method of this invention in which intersecting grooves are formed in the opposite faces of the cellular sheet-like element and filled with a fluid plastic material which is then hardened;

FIG. 2 is a partial cross-sectional view of the complete structural member, with the core sections being taken along the section line 2—2 of FIG. 1;

FIG. 3 is a partial pictorial view of the core of a structural member formed in accordance with another method of this invention utilizing a single cutting die;

FIG. 4 is a partial pictorial view of the bottom face of the structural member illustrated in FIG. 3 showing the completed member with the face sheets in position, the upper face sheet (in the drawing) being partially cut away to depict the details of the cavity construction;

FIG. 5 is a partial sectional view of the structural member of FIG. 3 taken along the section line 5—5 of FIG. 4 further depicting the matrix construction;

FIG. 6 is a partial pictorial view of a cutting die that may be used to form the grooves in the cellular member illustrated in FIGS. 3 through 5;

FIG. 10 is a pictorial illustration of a structural member formed in accordance with still another embodiment of this invention;

FIG. 11 is a partial cross-sectional view of the structural member of FIG. 10 taken along the section lines 11—11 of FIG. 10;

DESCRIPTION OF THE PREFERRED EMBODIMENT

Figure 7:
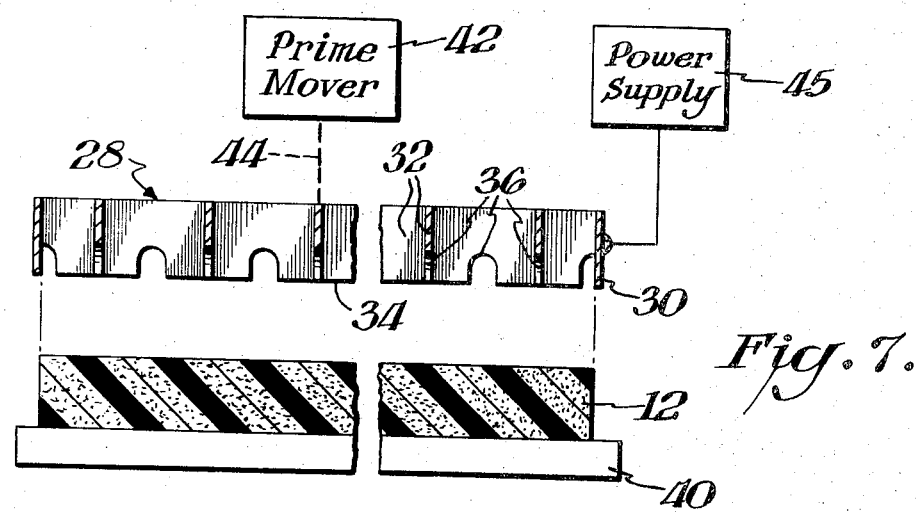
FIG. 7 is an illustration of one step in the method by which the grooves are formed using a heated die.

The structural member 10 illustrated in FIG. 1 is of a sandwich-type and includes a core 12 which may be fabricated from a sheet of cellular material to have a plurality of cavities which define a grid, lattice-like void, or matrix 14. The lattice-like void 14 is formed by cutting intersecting sets of rows and columns of grooves 16 in both the upper face 18 and the lower face 20 of the core 12. The sets of grooves are illustrated as perpendicular to each other but this need not be the case. This cutting may be accomplished by individual or ganged saw blades, individual knives, or hot wire cutting techniques if the cellular material is of the type that may be easily cut by heat as is described hereinafter. Whatever the cutting technique employed, and many are known in the art, these grooves 16 are formed to have a width that will be commensurate with the strength to be required of the structural member as will become more apparent hereinafter. Furthermore, the grooves 16 preferably are cut to a depth through the thickness dimension of the core 12 such that they almost but not quite cut through the core 12. In a preferred embodiment, the depth of the grooves will be at least 90% or more of the thickness of the core. The respective rows and columns of grooves 16 cut in the respective faces 18 and 20 are offset in an alternate configuration such that alternate row grooves, for example, alternate between the top and bottom faces, respectively. The column grooves are similarly positioned. In this manner, the respective sets of grooves will intersect at points within the core to form communicating cavities and yet permit the unity and integrity of the core to be maintained. As a minimum, the grooves must be formed to a depth sufficient such that the grooves formed in one face 18 intersect the grooves formed in the opposite face 20. Hence, it is within the scope of this invention to form the grooves in one face to a relatively shallow depth and those in the remaining face quite deep to intersect those grooves formed in the one face, i.e., the grooves in each of the respective faces need not be formed of the same depth.

As a second step in the operation, the grooves 16 are filled with a fluid plastic material 17 that is capable of being hardened to form a rigid, continuous, integral plastic lattice-like frame throughout the interior of the core 12. The filling may be accomplished by simply pouring the fluid material into the grooves in one face, turning the sheet over and pouring the fluid material into the grooves of the second face. Side retainers are used during filling to prevent fluid runoff. There are many available plastic materials that can be used for this purpose. Among these are the so-called thermosetting materials which normally melt and flow but after sufficient heating set to an infusible rigid structure and thereafter will not distort even with continued heat and pressure. Among these types of plastics in general are the phenol aldehydes, urea aldehydes and melamine aldehydes. Many of the allyl derivatives and certain polyvinyl alcohol derivatives will crosslink and cure and hence may be used and are quite well known to the industry. Such resins often constitute solutions of unsaturated polyesters in polymerizable monomeric solvents such as acrylates, methacrylates, vinyl toluene and similar materials.

Self-curing resins such as the epoxy resins such as diglycidyl ether of 2,2-vix(4-hydroxyphenol) propane with suitable amine acid or complex hardeners also may be used. Actually most resins having an epoxy equivalency greater than 1.00 may be employed. In many applications thermoplastic resins may be used such as polyhydroxyethers. Other resins suitable for use in these structural elements include polyesters and phenolics. As used herein, the term "hardenable fluid plastic material" refers to both the thermosetting resins as well as the thermoplastic resins and the self-curing epoxy and polyester resins. Included among the thermoplastic resins that might be employed are polystyrene which is a direct polymer of styrene and uses practically no plasticizer. In addition cellulose derivatives such as the esters are important plastics that can be used. Esters of this type include cellulose nitrate, cellulose acetate, acetate butyrate and acetate propionate. Nylon and other polyamides, polyimides and vinyl polymers such as vinyl chloride and vinyl acetate polymers and co-polymers may also be used as may the acrylates, vinylidene chloride and the polyolefins. Other types of casting resins or materials that can be used include some of the thermosetting resins that polymerize slowly from a thin monomeric liquid. These include the phenol aldehydes, allyl esters, vinyl castings and polyvinyl butyral and alcohol. In short, most of the hardenable fluid plastic materials that are well known in the industry may be used according to the desired strength requirements to be built into the structural members of this invention.

Whatever the particular plastic employed, when the fluid 17 is placed into the grooves 16 either by pouring, or alternatively, by submerging the entire core 12 into the fluid material, the plastic is allowed to harden either by itself if it is a self-curing type or is heated if it is of the thermosetting variety. Hence, the desired lattice-like framework of rigid support members which provide the necessary strength to the core is formed. This framework is noted to be a continuous, integral unit of rigid plastic material and forms an intersecting grid network in the grooves, as may be seen in FIG.1, which is intimately bonded to the surrounding cellular material 12.

The core material 12 may be lightweight cellular material preferably of the closed cell variety. Suitable cellular material includes foams such as the thermoset type foams, i.e., polyurethane or phenylic foams, or the thermoplastic foams such as foams of a polyolefin. These latter foams include polyvinyl chloride, polystyrene, polypropylene or polyethylene foams. Suitable chemical fire retardants may be placed in the foam depending upon the particular application. Foam rubber, and even rubber, may also be used. In many cases, it is also suitable to use many of the known open cell foams. In this latter case, however, in order to maintain the low density of the resulting structural member, the fluid plastic employed must be handled quickly and cured or hardened quickly such that entry of the fluid resin into the open cells is minimized. Otherwise, the weight of the structure increases to an unacceptable limit. Of course, if weight is not a factor, the open cells may be filled with the resin to provide an extremely strong structure.

As the next step in the process, face sheets 22 are bonded to the upper and lower faces 18 and 20, respectively, to complete the structure. To accomplish this the same fluid material used to form the matrix is placed in a thin layer 21 on the top surface 18 and the bottom surface 20, respectively, and the face sheets placed thereover. The fluid material is then hardened, with the application of heat and pressure, if thermosetting resin is used. These face sheets 22 may be formed of metal, any suitable plastic, paper, wood, glass cloth, fiber glass, or similar materials. If a pervious material such as glass cloth is used, it is thoroughly impregnated with the fluid material prior to positioning over the surfaces 18, 20. Preferably, the face sheets 22 are placed on the faces of core 12 while the fluid material is still in the grooves—prior to hardening. This facilitates bonding of the face sheets with the matrix if all of the fluid is allowed to harden simultaneously.

When hardened, it may be seen that the structure created has a plurality of what may be termed offset T- or I-beams, the I-beams being formed by the now integrally bonded combination of the face sheets 22 together with the contiguous layer of resin in combination with the resin in the grooves 16 which together form a relatively lightweight strong structure having high bending, compressive and/or shear strengths. The lattice-like framework formed by the hardened resin in the grooves 16 is seen to in effect surround and enclose as well as provide a skeletal framework for the cellular core 12. Furthermore the matrix is in intimate contact with the core 12 which insures good bonding therebetween. All of these features permit the construction of a lightweight strong structural member.

Another embodiment of this invention may be seen in FIGS. 3, 4 and 5. This embodiment preferably is constructed using a cutting grid as seen in FIG. 6. This grid has a base member 30 in which a heating element is enclosed such that the metal knives 32 forming the grid-like arrangement seen are hot and may be used to cut the heat meltable foams relatively easily. These knives 32 are illustrated as being arranged in a row and column configuration. The knife edge 34 between each row and column intersection has a recessed portion 36 such that when the cutting die 28 is lowered upon a block of the foam to perform the cutting operation, as is seen most clearly in FIG. 7, the core 12 is not cut completely through—rather small linking sections 48 remain. In this figure there is seen a base plate 40 upon which is lain the core 12 to be cut. Above the core 12 is positioned the heated cutting die 28 which is moved downwardly by a suitable prime mover 42 acting through the linkage illustrated by the dashed line 44. A suitable power source 45 provides the power.

Figure 9:
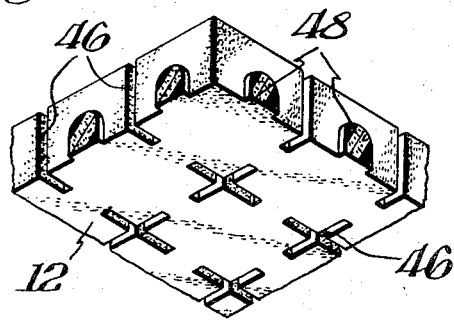
FIG. 9 is a partial pictorial illustration of the core of the structural member shown in FIGS. 3-5.
Figure 12:
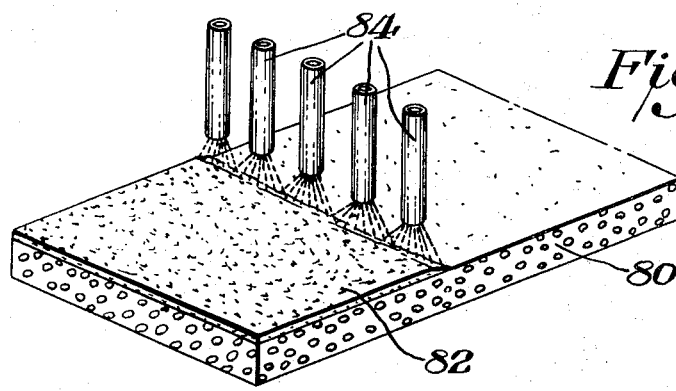
FIG. 12 is a pictorial view of one step of another method according to this invention of forming a structural member having a rigid lattice-like framework bonded to cellular material for structural strength.
Figure 13:
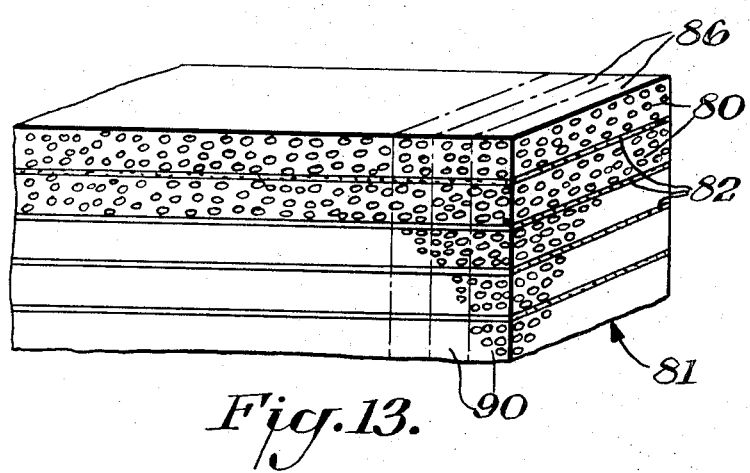
FIG. 13 is a pictorial view of the second step of the method initially shown in FIG. 12.

This cutting operation produces the row and column grooves 46 as may be seen most clearly in FIG. 3. These grooves 46 are cut completely through the thickness of the core 12 except in those regions 48 which correspond to the recessed areas 36 of the cutting die 28. Thus, the completely cut through sections of the grooves 46 may be seen from the bottom side of the core 12 which is illustrated in FIG. 4. The material 48 left by the recessed portion 36 is also seen in FIGS. 5 and 9 together with the completely cut through grooves 46. This provides an intersecting grid matrix of grooves which extend completely and continuously from the top to the bottom of the core 12.

Figure 8:
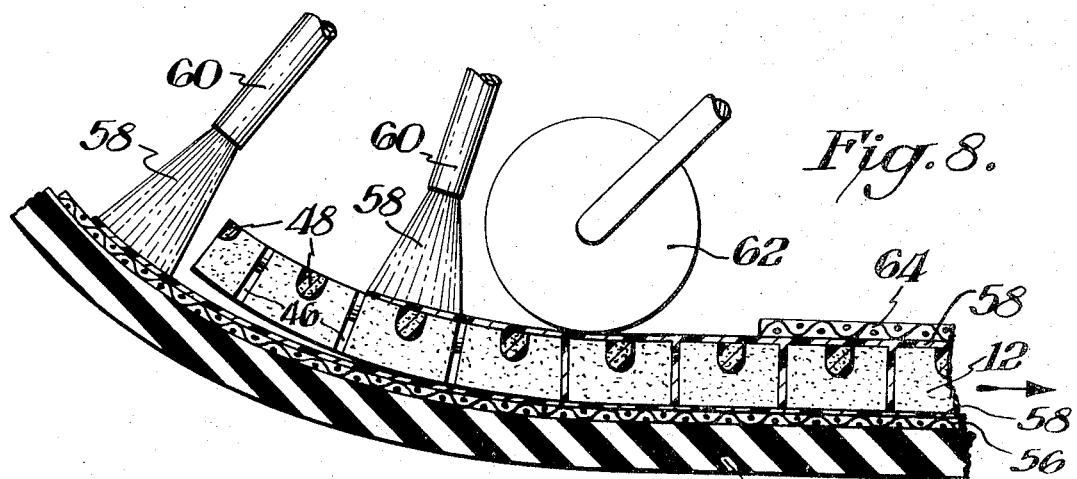
FIG. 8 is a side view depicting another step in the process of forming the structural member illustrated in FIGS. 3 through 5.

As a next step in the process, the grooved core 12 is placed upon a forming bed 54 (FIG. 8) which in this case is illustrated as being curved in the event the structural member is to be used as part of a boat hull, for example. Next a face sheet 56 is laid down on the forming plate 54. This face sheet in this example may be made of glass cloth. Next a thermosetting resin 58 is sprayed from the nozzle 60 connected to a suitable source onto the inside or upper surface of the face sheet 56 as a layer 21. The core 12 is now placed upon the top of the face sheet 56 and the upper surface of the core sprayed with a thermosetting resin 58 using the nozzle 60 or, in fact, another nozzle may be used, as illustrated, to form a second layer 21. A roller 62 is then moved across the upper surface of the core 12 so as to compress the core 12 and insure that the resin material thoroughly fills the several grooves 46.

As a final step, an upper sheet 64 of a resin impregnated glass cloth is placed on top of the resin impregnated core 12 over the resin layer 21 and the entire structure is heated, if a thermosetting resin is used, or is allowed to cure if a polyester or epoxy resin is used. Often it is desirable to cure the structure under pressure as well as heat in which case a mating member to the forming bed 54 (not shown) compresses the laminate as desired, the forming members 54 being heated. The resulting structure is as illustrated in FIG. 4, a structure having a lattice-like framework of rigid support members throughout the interior of the core that is bonded securely to the face sheets 64 and 56. The bonding resin is integral with the resin matrix which is formed within the interior of the core and with the resin which impregnates the glass cloth. The bonding thus between the core and the matrix and the face sheets is seen to be an integral bonding technique which provides for relatively strong, secure structural members that are relatively lightweight and yet have high bending, compressive and shear strength.

In a further embodiment of this invention illustrated in FIG. 10, individual blocks 70 of the above described foam material are placed upon a face sheet 72 of scrim cloth or other suitable material having a layer of resin 74 thereon. A spacing 76 is maintained between each of the blocks 70 to form an intersecting network of grooves, in this instance, a rectangular row and column network of grooves 76 is illustrated. Next, resin is flowed over the top surface of the foam blocks 70 and permitted to flow into the grooves 76. As a final step a face sheet 78 may be placed upon the top surface (in the drawing) and the entire structure heated to set the thermosetting resin or if the resin is self-curing, the resin is allowed to harden on its own. Herein the result is somewhat the same as that described in connection with FIG. 6 in that the now hardened resin forms a rigid matrix network that traverses the entire thickness of the structural member between the upper and lower face sheets.

Figure 15:
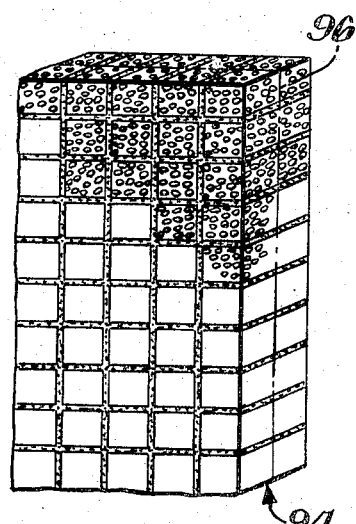
FIG. 15 is a pictorial view of the fourth step of the method initially shown in FIG. 12.
Figure 14:
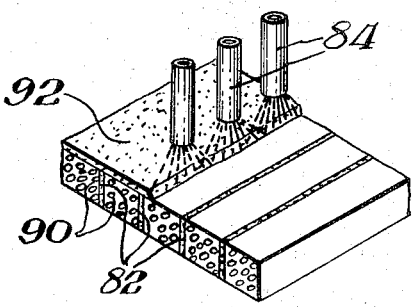
FIG. 14 is a pictorial view of the third step in the method initially shown in FIG. 12.

According to another method of this invention, the structural members illustrated in FIG. 10 may be formed by the method illustrated in FIGS. 12 through 15 inclusive. In this method, an individual sheet of the cellular material described hereinbefore is laid flat and a layer of resin 82 disposed thereacross by a suitable applicator, in this instance illustrated as spray devices 84. The sheets alternating with the resin layers 82 are built up to form the intermediate member 81 seen in FIG. 13 and the foam is either allowed to cure or harden through the passage of time or is heated to effect the necessary curing to harden. This foam structure is then sliced or cut, by suitable cutting means of the type described hereinbefore along the lines 86 denoted in phantom in FIG. 13, transversely to the layers 82 to form a plurality of slabs 90 (FIG. 14). The slabs 90 are then laid flat as seen in FIG. 14 and a layer of resin 92 of the same type as described hereinbefore is applied across the upper surface thereof. Next another slab 90 is placed over the resin layer 92, another layer of resin 92 is applied and so forth until the structural member 94 as illustrated in FIG. 15 is achieved. The resin is hardened as described hereinbefore. This structural member may then be sliced or cut vertically (in the drawing) along the line 96 transveresly to the layers of hardened resin 82, 92 to form sheets of the structural member desired, i.e., the rigid matrix network 82, 92 transverses the entire thickness of the structural member between and transversely to the two faces. As illustrated in FIG. 10, face sheets may be applied to either of the faces of the structural member so fabricated as desired.

Figure 16:
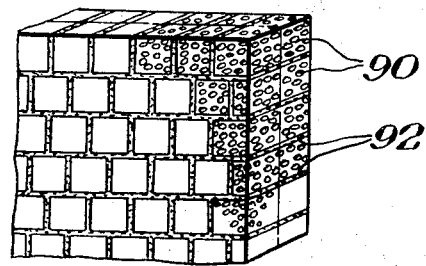
FIG. 16 is a pictorial view of an alternative structure that can be formed by the method depicted in FIGS. 12 through 15.

In a modification of the method illustrated in FIGS. 12 through 15, the slabs 90 may be offset slightly before layering with resin such that the resin layers 82 in the individual slabs 90 do not form continuous lines, i.e., the slabs 90 are offset such that the resin layers 82 of one slab are between the resin layers 82 of the adjoining slabs. This provides the staggered effect seen in FIG. 16 which proves in many respects a stronger material more resistant to non-perpendicular or horizontal loads than the structural member created by the methods of FIGS. 12 to 15, inclusive.

In still another method of this invention, the foam body may be molded using mold halves not unlike the cutting dies illustrated in FIG. 6. In this case the skin would normally be somewhat tough and the body is slit in the thickness dimension to form two foam bodies which are then processed as described herein.

There has thus been described a novel sandwich-type structural member having many desirable qualities such as high bending, compressive and shear strength, lightweight and secure bonding that is not available in most other prior art structures. Several methods of forming these structural members, sandwich-type or not, are described.

It is obvious that many embodiments may be made of this inventive concept, and that many modifications may be made in the embodiments hereinbefore described. Therefore, it is to be understood that all descriptive material herein is to be interpreted merely as illustrative, exemplary and not in a limited sense. It is intended that various modifictaions which might readily suggest themselves to those skilled in the art be covered by the following claims, as far as in the prior art permits.

What is claimed is:

1. A structural member having a thickness dimension defined by opposite faces comprising:
    an integral lattice-like framework of web-like elements formed of a rigid organic polymer plastic material defining voids,
    a lightweight organic polymer foam material filling said voids and intimately bonded to said framework, and
    a longitudinal portion of each of said elements extending continuously through the thickness dimension of said filling material.

2. A structural member accordance with Claim 1 which also includes first and second integral face sheets respectively bonded to the respective faces of said member including both said framework of web-like elements and the lightweight material filling said voids.

3. A structural member in accordance with Claim 2 wherein substantially all of said framework of web-like elements extends through the thickness of said filling material and is in continuous bonded contact with each of said face sheets, thereby to afford compressive strength to said member.

4. A structural member in accordance with Claim 1 wherein the remaining longitudinal portion of said framework of web-like elements extends at a minimum more than half way through said thickness dimension.

5. A structural member accordance with Claim 1 wherein the remaining longitudinal portion of said framework of web-like elements extends at a minimum through more than nine-tenths of said thickness dimension and are continuous in at least one of said faces.

6. A structural member in accordance with Claim 5 which also includes:
    first and second face sheets respectively bonded to the respective faces of said member including both the framework of web-like elements and the lightweight material filling said voids, and
    in which said framework is a thermosetting plastic.

7. A structural member in accordance with Claim 5 which also includes:
    first and second face sheets respectively bonded to the respective faces of said member including both the framework of web-like elements and the lightweight material filling said voids, and
    in which said cellular material is rigid.

References Cited

UNITED STATES PATENTS

| | | | |
|---|---|---|---|
| 3,000,144 | 9/1961 | Kitson | 52—309 |
| 3,043,730 | 7/1962 | Adie | 161—161 |
| 3,523,860 | 8/1970 | Prohaska et al. | 161—160 |
| 3,407,110 | 10/1968 | Axelson et al. | 161—159 |

WILLIAM J. VAN BALEN, Primary Examiner

U.S. Cl. X.R.

52—309; 161—114